United States Patent
Kennedy et al.

(10) Patent No.: US 12,270,916 B2
(45) Date of Patent: Apr. 8, 2025

(54) SYSTEM AND METHOD FOR AIDING DATA PROCESSING FOR SIGNALS OF OPPORTUNITY-BASED ASSURED POSITION, NAVIGATION AND TIMING (PNT)

(71) Applicant: Echo Ridge LLC, Great Falls, VA (US)

(72) Inventors: Joseph P. Kennedy, Great Falls, VA (US); John P. Carlson, Dulles, VA (US); Martin Alles, Great Falls, VA (US)

( * ) Notice: Subject to any disclaimer, the term of this patent is extended or adjusted under 35 U.S.C. 154(b) by 808 days.

(21) Appl. No.: 16/937,900

(22) Filed: Jul. 24, 2020

(65) Prior Publication Data

US 2021/0026022 A1    Jan. 28, 2021

Related U.S. Application Data (60) Provisional application No. 62/877,950, filed on Jul. 24, 2019.

(51) Int. Cl.
*G01S 19/31*   (2010.01)
*G01S 19/25*   (2010.01)

(52) U.S. Cl.
CPC ............ *G01S 19/31* (2013.01); *G01S 19/254* (2013.01); *G01S 19/256* (2013.01)

(58) Field of Classification Search
CPC ....... G01S 19/31; G01S 19/254; G01S 19/256
See application file for complete search history.

(56) References Cited

U.S. PATENT DOCUMENTS

| | | |
|---|---|---|
| 5,652,592 A | 7/1997 | Sanderford |
| 5,794,128 A | 8/1998 | Brockel et al. |
| 5,917,449 A | 6/1999 | Sanderford et al. |
| 6,094,168 A | 7/2000 | Duffet-Smith et al. |
| 6,275,705 B1 | 8/2001 | Drane et al. |
| 6,313,789 B1 | 11/2001 | Zhodzishsky |
| 6,393,292 B1 | 5/2002 | Lin |
| 6,492,945 B2 | 12/2002 | Counselman, III et al. |
| 6,518,918 B1 | 2/2003 | Vannucci |
| 6,522,890 B2 | 2/2003 | Drane et al. |
| 6,529,165 B1 | 3/2003 | Duffett-Smith |
| 6,571,082 B1 | 5/2003 | Rahman et al. |
| 6,865,395 B2 | 3/2005 | Riley |
| 6,970,795 B1 | 11/2005 | Burgett |
| 6,978,131 B1 | 12/2005 | Lee |
| 7,019,693 B2 | 3/2006 | Spirito |

(Continued)

FOREIGN PATENT DOCUMENTS

| | | |
|---|---|---|
| WO | 2007113086 A1 | 10/2007 |
| WO | 2008119635 A1 | 10/2008 |
| WO | 2009112293 A1 | 9/2009 |

OTHER PUBLICATIONS

Derek Kurth, "Range-Only Robot Localization and SLAM with Radio," Robotics Institute, Carnegie Mellon University, May 2004, 60 pgs.

*Primary Examiner* — Bernarr E Gregory
*Assistant Examiner* — Hailey R Le (57) ABSTRACT

A system and method to opportunistically receive and use measurements on a priori unknown radio signals, not intended for radio navigation or geolocation, in conjunction with aiding data to improve navigation/geolocation position and time estimation yield and accuracy.

27 Claims, 8 Drawing Sheets

(56) References Cited

U.S. PATENT DOCUMENTS

| | | |
|---|---|---|
| 7,035,650 B1 | 4/2006 | Moskewitz et al. |
| 7,171,345 B2 | 1/2007 | Mocek |
| 7,398,086 B2 | 7/2008 | Morgand et al. |
| 7,620,368 B2 | 11/2009 | Wang et al. |
| 7,750,848 B2 | 7/2010 | Normark et al. |
| 7,773,995 B2 | 8/2010 | Rappaport et al. |
| 8,000,656 B1 | 8/2011 | Jiao et al. |
| 8,018,383 B1 | 9/2011 | Schantz et al. |
| 8,086,187 B1 | 12/2011 | Davis et al. |
| 8,106,818 B2 | 1/2012 | Bhattacharya et al. |
| 8,126,453 B2 | 2/2012 | Wang |
| 8,188,912 B1 | 5/2012 | Weisenburger |
| 8,229,416 B2 | 7/2012 | Akman et al. |
| 8,225,160 B2 | 8/2012 | Duffett-Smith et al. |
| 8,270,910 B2 | 9/2012 | Picard |
| 8,332,198 B1 | 12/2012 | Barclay et al. |
| 8,339,142 B2 | 12/2012 | Oowada |
| 8,339,310 B2 | 12/2012 | Mizuochi et al. |
| 8,428,617 B2 | 4/2013 | Maher |
| 8,437,772 B2 | 5/2013 | Moeglein et al. |
| 8,451,763 B2 | 5/2013 | Brundage et al. |
| 8,843,077 B2 | 9/2014 | Haran |
| 9,588,218 B2 | 3/2017 | Kennedy |
| 9,594,170 B2 | 3/2017 | Kennedy |
| 9,739,891 B2 | 8/2017 | Kennedy |
| 10,212,687 B2 | 2/2019 | Kennedy |
| 11,226,416 B1 * | 1/2022 | Pullen ..................... G01S 19/10 |
| 2002/0160717 A1 | 10/2002 | Persson et al. |
| 2004/0008138 A1 | 1/2004 | Hockley et al. |
| 2004/0033808 A1 | 2/2004 | Rorabaugh |
| 2005/0085223 A1 | 4/2005 | Liu |
| 2005/0197769 A1 | 9/2005 | Soehren |
| 2005/0200525 A1 | 9/2005 | Duffett-Smith et al. |
| 2005/0260962 A1 | 11/2005 | Nazrul et al. |
| 2006/0094365 A1 | 5/2006 | Inogai et al. |
| 2006/0128315 A1 | 6/2006 | Belcea |
| 2006/0148429 A1 | 7/2006 | Inogai et al. |
| 2006/0174162 A1 | 8/2006 | Varadarajan et al. |
| 2006/0229018 A1 | 10/2006 | Mlinarsky et al. |
| 2006/0229020 A1 | 10/2006 | Mlinarsky et al. |
| 2006/0240839 A1 | 10/2006 | Chen et al. |
| 2006/0287824 A1 | 12/2006 | Lin |
| 2007/0019769 A1 | 1/2007 | Green et al. |
| 2007/0072552 A1 | 3/2007 | Jonsson et al. |
| 2007/0127559 A1 | 6/2007 | Chang |
| 2007/0223571 A1 | 9/2007 | Viss |
| 2008/0026748 A1 | 1/2008 | Alexander et al. |
| 2008/0057873 A1 | 3/2008 | Huang et al. |
| 2008/0084951 A1 | 4/2008 | Chen et al. |
| 2008/0274753 A1 | 11/2008 | Attar et al. |
| 2009/0094492 A1 | 4/2009 | Music et al. |
| 2009/0113245 A1 | 4/2009 | Conner |
| 2009/0213828 A1 | 8/2009 | Brundage et al. |
| 2009/0233621 A1 | 9/2009 | Rhoads et al. |
| 2009/0281729 A1 | 11/2009 | Duffett-Smith et al. |
| 2010/0049469 A1 | 2/2010 | Wirola |
| 2010/0062722 A1 | 3/2010 | Dykema et al. |
| 2010/0099361 A1 | 4/2010 | Lundstrom et al. |
| 2010/0204916 A1 | 8/2010 | Garin |
| 2011/0037650 A1 | 2/2011 | Lennen |
| 2011/0057836 A1 | 3/2011 | Ische |
| 2011/0065457 A1 | 3/2011 | Moeglein et al. |
| 2011/0109504 A1 | 5/2011 | Ellis |
| 2011/0124295 A1 | 5/2011 | Mahjoubi Amine et al. |
| 2011/0136457 A1 | 6/2011 | Yu |
| 2011/0223869 A1 | 9/2011 | Harteneck |
| 2011/0234454 A1 | 9/2011 | Mathews et al. |
| 2011/0287721 A1 | 11/2011 | Haran |
| 2011/0306306 A1 | 12/2011 | Reed |
| 2012/0071107 A1 | 3/2012 | Falck et al. |
| 2012/0225624 A1 | 9/2012 | Kyosti et al. |
| 2013/0029608 A1 | 1/2013 | Kuo et al. |
| 2013/0231060 A1 | 9/2013 | Ozaki et al. |
| 2014/0051363 A1 | 2/2014 | Kennedy et al. |
| 2015/0326463 A1 * | 11/2015 | Solondz .............. H04L 43/0829<br>370/252 |
| 2016/0014713 A1 * | 1/2016 | Kennedy ............. G01S 5/02526<br>455/456.1 |
| 2019/0072634 A1 * | 3/2019 | Johnson ................... G01S 1/38 |

* cited by examiner

Figure 8

SYSTEM AND METHOD FOR AIDING DATA PROCESSING FOR SIGNALS OF OPPORTUNITY-BASED ASSURED POSITION, NAVIGATION AND TIMING (PNT)

The present application claims the priority of U.S. Provisional Patent Application No. 62/877,950 filed Jul. 24, 2019.

This disclosure is directed at providing assured positional, navigational and timing (PNT) information in places and/or at times when Global Positioning System/Global Navigation Satellite Systems (GPS/GNSS) signals are unavailable, impaired, jammed or spoofed. Assured PNT is defined as high availability and reliability PNT information. The specific assured PNT approach is to augment navigation satellite system signals, whether GNSS/GPS or from other GNSS systems, with measurements derived from signals of opportunity (SoOPs). SoOPs are defined as RF sources not mainly intended for positional, navigational and timing purposes (e.g., non-GNSS sources). Signals of opportunity lack the characteristics of GNSS signals, so additional information (referred to as "aiding data") and signal/data processing is required to use the SoOPs to extract useful measurements and estimate PNT information. Non-GNSS signal-derived measurements include a variety of known RF signal measurement types and can be generally described as ranging measurements to include time of arrival, time difference of arrival, Doppler, differential Doppler, and others. Novel methods for accessing and selecting aiding data, processing the signals and aiding data, and embodying these and associated assured PNT system functions is the subject of this disclosure. Other RF sources which are not GNSS or SoOPs (such as dedicated terrestrial timing broadcast beacons (such as NextNav) or LORAN (Long-range Aid to Navigation) transmitters which are well known through prior art) may also have characteristics similar to SoOPs which require aiding data for PNT purposes, and the subject methods can also be applied.

There is a recognized concern about the availability of reliable PNT information in both the government and commercial sectors. It is driven by instances of jamming and spoofing of traditional applications of PNT such as the Department of Defense (DoD) and commercial maritime. It is additionally driven by instances of PNT non-availability for traditional applications such as receiver operation in urban canyon or pedestrian use in indoor environments. It is also driven by emerging applications such as autonomous drones and automobiles.

There is on-going research and product development activity towards enabling assured PNT information. The prior art research spans many approaches to enabling assured PNT information. One prior art approach uses another GNSS system, such as GLONASS, Galileo, etc. to augment GPS. Another prior art approach results in "hardening" of GPS where directional antennas or robust signal processing is used to avoid jamming and spoofing. Another prior art approach is augmenting GPS with non-RF modalities such as mechanical, optical, celestial, etc. information to refine the GPS solution. And yet another prior art approach is augmenting GPS with SoOPs as described in U.S. Pat. Nos. 10,212,687, 9,739,891, 9,594,170 and 9,588,218, all commonly owned by the applicant of the present disclosure, the disclosures of which are hereby incorporated by reference.

It was also known to use combinations of these prior art approaches to increase the availability and reliability of PNT information.

The advantages of using SoOPs include that they are free, plentiful, diverse and growing in number. SoOPs include signals emanating from systems such as Wi-Fi, cellular, communications satellites, radars, digital television, satellite broadcast (including television), etc. SoOPs can originate from space, in the air, on the ground; and can be owned/operated by commercial entities, private entities, US government entities, or foreign entities. Many of these sources of SoOPs were generally not in existence when GPS was conceived and deployed. Given that these SoOPs are not intended for PNT purposes, there are challenges in using them for PNT purposes.

Some of the challenges are due to the differences between SoOP signals and GPS signals including: 1) the precise location of source of the SoOP may not be known, 2) the source of the SoOP may not have a stable clock, 3) the SoOP may not be ubiquitously available e.g., signals from satellite constellations, 4) the SoOP may not have a waveform optimized for PNT purposes, 5) the SoOP waveform characteristics may not be known, 6) SoOPs may not be optimized in position to minimize dilution of precision (DOP), and 7) SoOP systems generally don't broadcast navigation aiding information including health data associated with the SoOP.

In order to use SoOPs effectively for PNT purposes, approaches must be employed that compensate for the fact that SoOPs are not intended for PNT purposes. The present disclosure is directed to "aiding data processing" which uses additional information to aid in the processing of SoOPs to increase the reliability and availability of the SoOPs for PNT purposes.

DETAILED DESCRIPTION OF THE DRAWINGS

It was known to use aiding data for the purpose of determining PNT information in prior art systems. For example, in GPS systems, the transmitted signal included aiding data to assist the host platform in making accurate PNT measurements. The aiding data was embedded in the RF signal and included health data for the source. Another version of GPS called Assisted GPS (A-GPS) provided the aiding data to the host platform separate from the navigation signals transmitted by the satellite for use by the host platform. The aiding data in these situations was derived from the same navigational system providing the navigation signals for the PNT calculations. In the present disclosure, the aiding data may not be embedded in the RF source, nor must it be derived from the same system that is providing the signals used for determining location, e.g., SoOPs and non-GNSS RF source. Although some of the examples described below use SoOPs, the techniques described apply equally to non-GNSS signals.

Figure 1:
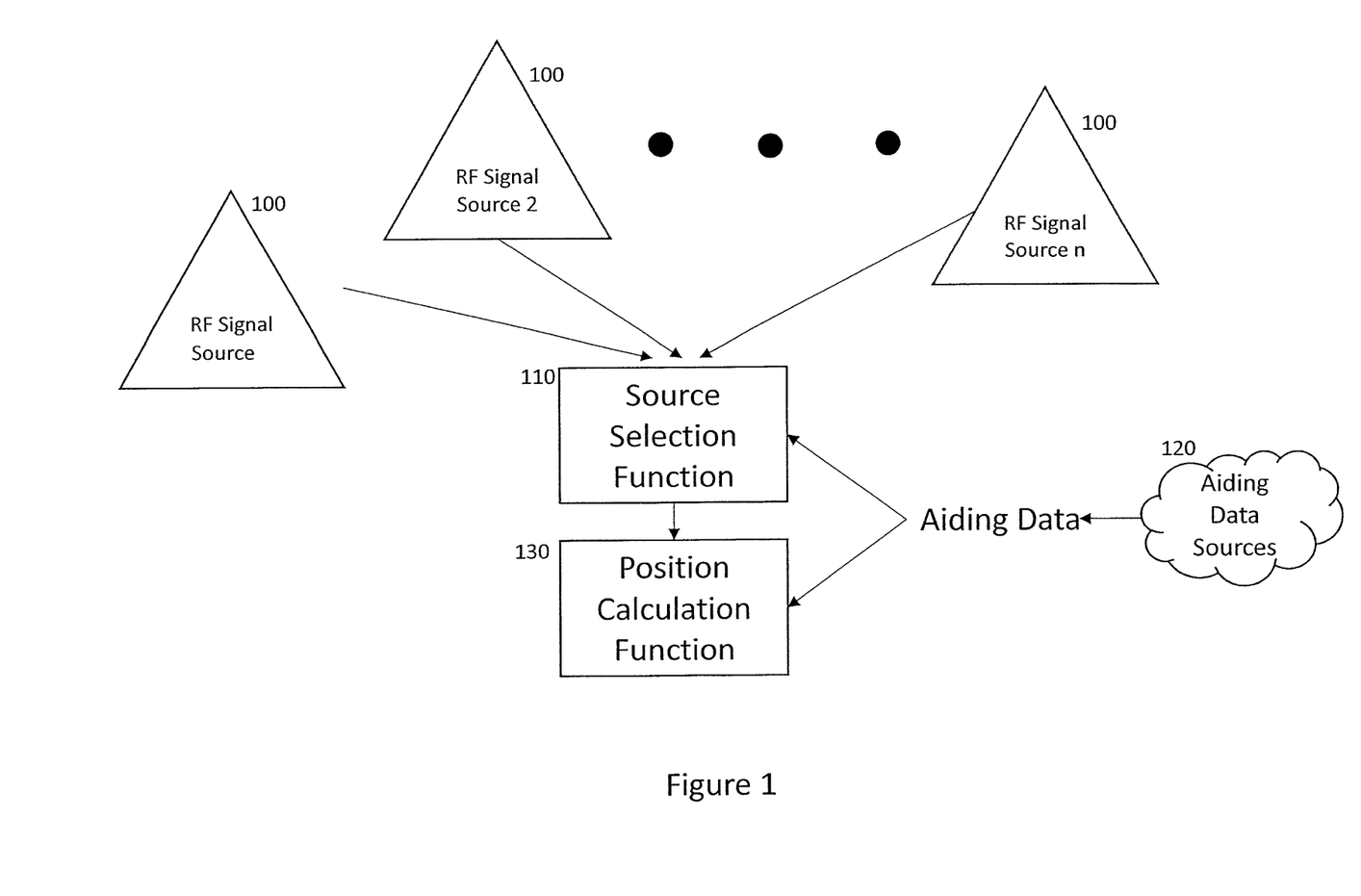
FIG. 1 shows a high-level functional block diagram of one embodiment of the current disclosure.

FIG. 1 illustrates one embodiment of the present disclosure that uses aiding data to assist in the selection of SoOPs and is also used to determine PNT information of the host platform. Various RF signal sources (SoOPs) 100 may be available for use in determining PNT information. Because the SoOPs are not intended for positional, navigational and timing purposes, the signals lack sufficient information by themselves necessary to determine PNT data. Thus, aiding data 120 is used to provide the additional information to the position calculation function 130 that makes the SoOP useful for PNT purposes. Aiding data 120 is also useful for assisting in the selection of which SoOPs to use for the PNT calculation. The source selection function 110 selects and weights the SoOPs for use by the position calculation function 130. The selection and weighting of the SoOPs can be performed as a function of the available aiding data 120. The selected/weighted signals from the source selection function 110 and aiding data 120 are then used to calculate PNT information by the position calculation function 130.

Depending on the application, the host platform may be associated with a user, an RF source, a receiver, the aiding data, or may be remote from the user, RF source, receiver or aiding data. For example, the host platform may be associated with a communication satellite whose main purpose is providing communications but a user uses the host platform as an RF source for PNT purposes. In another example, the host platform can be associated with a user and can include a vehicle, ship or plane.

Figure 2:
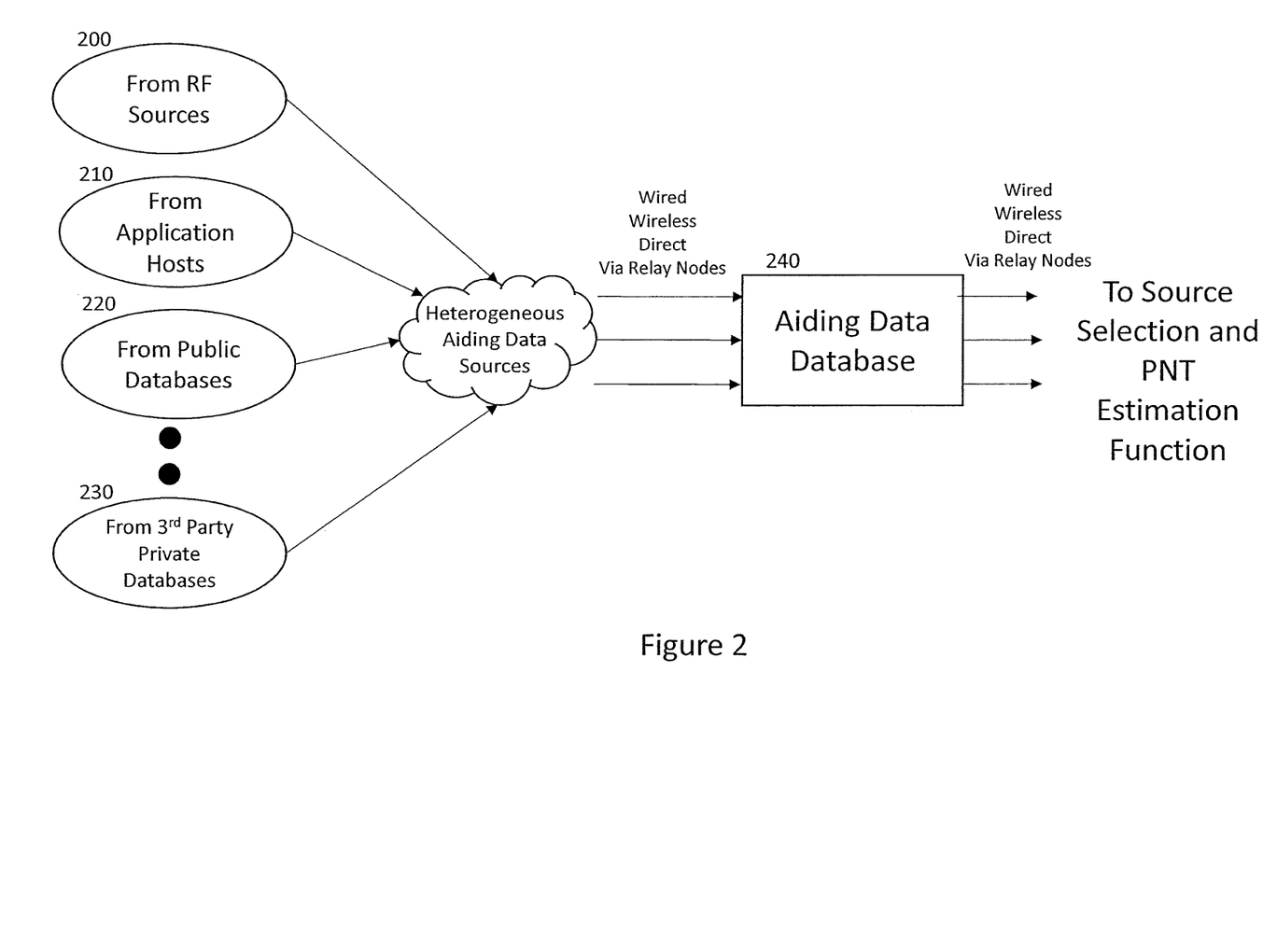
FIG. 2 shows how aiding data from within the RF signal sources and from other sources are used in the RF source selection algorithm.

As shown in FIG. 2, aiding data can be of many different types and from many different sources. Aiding data can be from an RF source 200. For example, the RF source 200 may transmit a time tag that can be used by a host platform in conjunction with a received SoOP from a separate source to determine PNT information for the host platform. Aiding data can be from the hosting platform 210 for which PNT is being generated. For example, hosting platform may include RF spectrum sensing data which indicates what RF frequencies may be received without interference at the hosting platform. Aiding data can be from public databases 220 such as from a database that contains the locations of commercial television broadcast towers. Aiding data can be from third party private database 230 such as precision ephemeris for a non-GNSS satellite constellation, e.g., communications satellites. The aiding data derived from the sources can be maintained in aiding data database 240 to be accessed by the source selection function and the position calculation function.

Aiding data can be collected and communicated via a variety of methods including wirelessly (a local area network or a mobile satellite service), a wired connection such as an ethernet or USB connection on a desktop computer or portable computing/communications device. It can also be communicated via a distributed network where the data is passed via set of intermediary nodes as it is routed through a network. Providing aiding data to PNT application node users can be a many-to-many topology with bi-directional communications. Aiding data can be communicated to application node through a single connection or multiple connections. Likewise, providing spectrum conditions and application node PNT requirements to aiding data sources can be a many-to-many topology and shares the characteristics described above for aiding data to application node communications.

Figure 3:
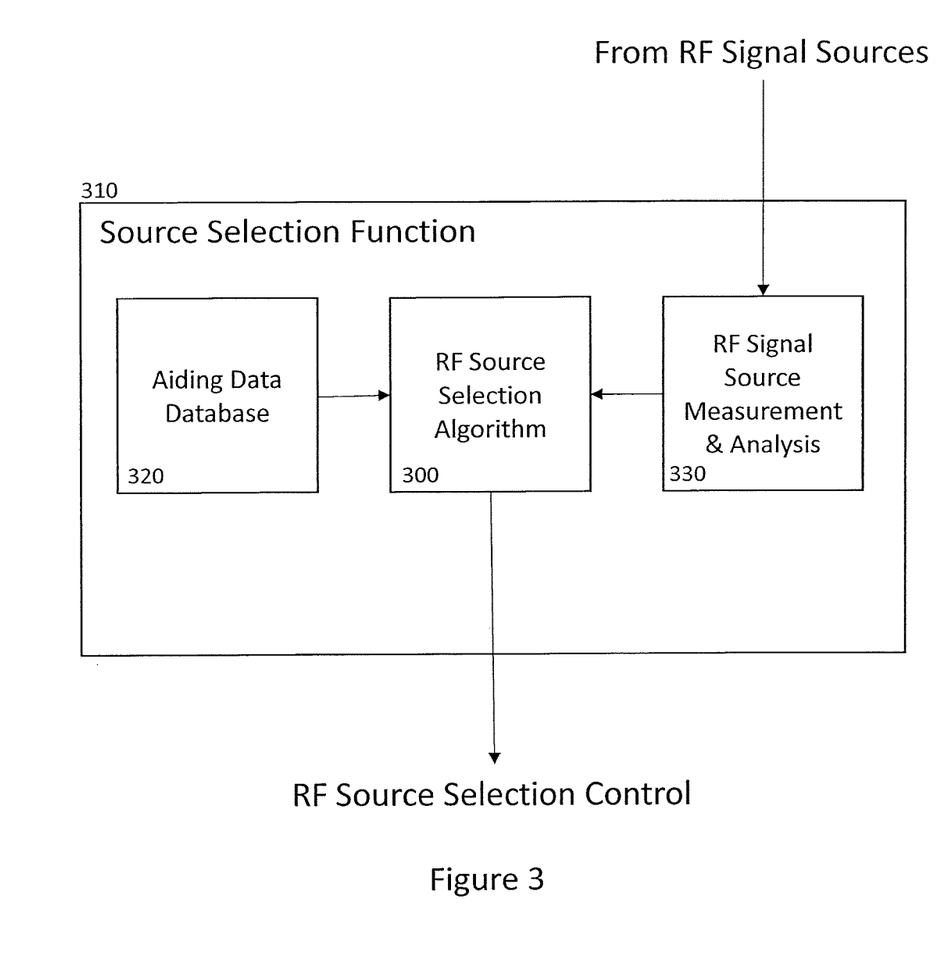
FIG. 3 shows a high-level block diagram of the RF source selection process.

FIG. 3 shows an embodiment of how the source selection function uses aiding data to select SoOPs to participate in the PNT calculation. In the prior art, it was known to use selection criteria for selecting base station sources for UTDOA-based mobile phone location. However, these types of PNT systems used signals from a cooperative communications network, such as a cellular network, and were not implemented with SoOPs. U.S. Pat. No. 8,428,617, having an inventor in common with the present disclosure, was one such prior art system. FIG. 3 illustrates one embodiment of a source selection function 310 that uses aiding data from a source other than the SoOP source to select the SoOPs to create PNT data. The RF Selection Source Algorithm 300 can receive input from an aiding data database 320 as well as measurements and analysis of the RF signal 330. Aiding data can include location of SoOP sources (or means to predict location of sources), SoOP timing information, SoOP waveform information, SoOP source health information, and other source-specific data. Aiding data will vary depending on the SoOP sources available. It can include apriori information as well as dynamic real-time data. RF Signal Source Measurement and Analysis module 330 includes measurements of the SoOPs and can include time of arrival (TOA), time difference of arrival (TDOA), direction of arrival (DOA) and other well-known signal measurements depending on the capability of the receiving sensors and antennas. The measurements may be associated with a quality metric that provides an indication of the quality of the measurement.

There are many embodiment options for hosting, accessing and processing aiding data. Some of the options are discussed below. These options depend on many factors including the application being supported and the nature of the SoOPs used. All options involve some computer processing, memory, and communications facilities and interfaces (wired or wireless).

Figure 4:
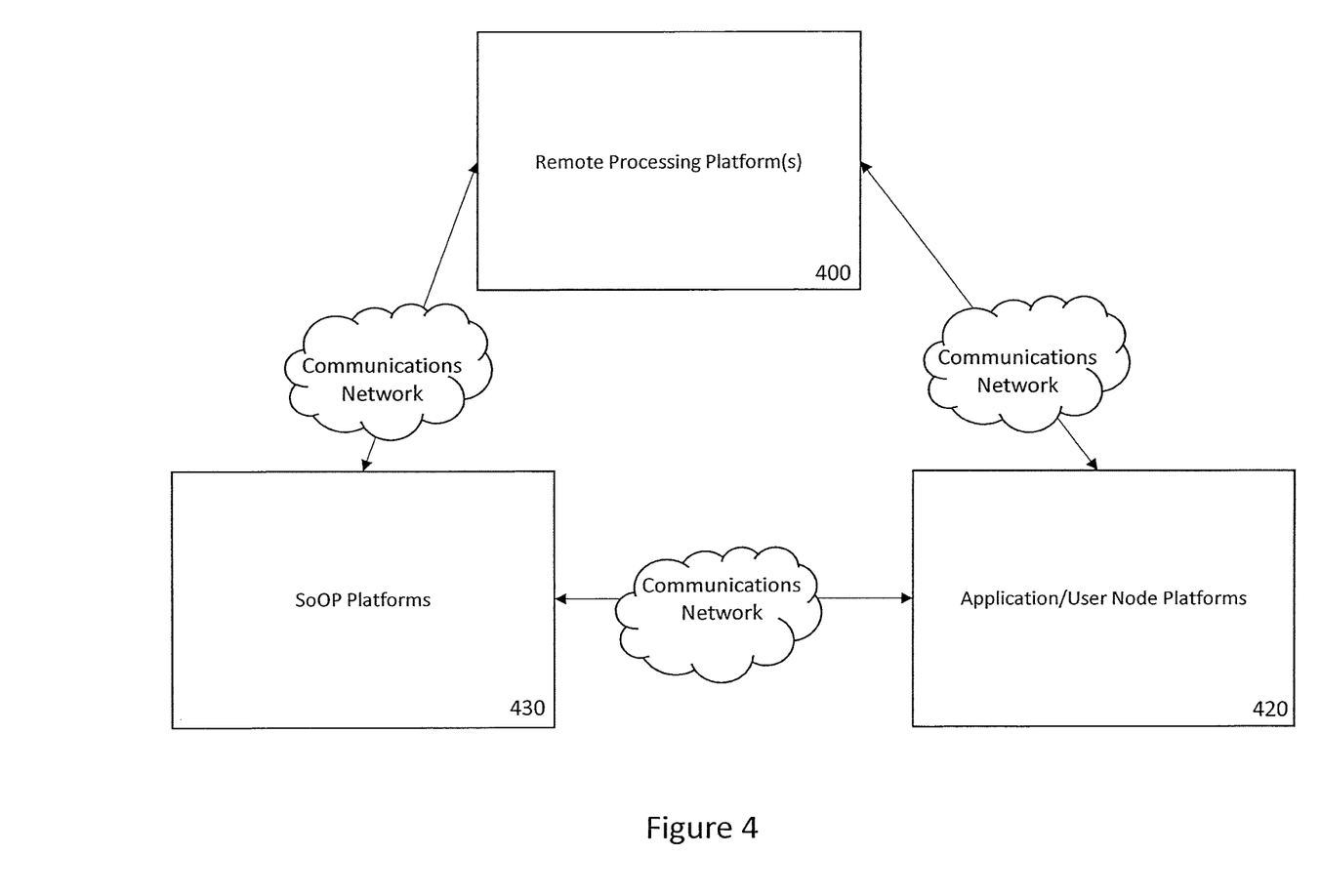
FIG. 4 shows a high-level framework for different embodiments of aiding data processing and SoOP-based PNT estimation.

With respect to FIG. 4, in one embodiment, a simple architecture can include three types of platforms: SoOP platforms 430 which emit the SoOP RF signals (one example would be a broadcast television transmitter), Application/User Node platforms 420 which host the application which is using the PNT service (one example would be an autonomous vehicle), and Remote Processing platforms 400 (one example would be a database containing aiding data) which contain processing and memory resources, and communications interfaces to connect to the SoOP platforms 430 and/or the Application/User Node platforms 420. The communications interfaces between these platforms can be of many types including wired, wireless, software interfaces, and multi-hop networks. Each of the platforms can have different functionality associated with them and can provide feedback to and influence the behavior of the other platforms through the use of a feedback loop. In one example, the Application/User Node can make non-RF measurements, such as inertial measurements which can be combined with RF measurements made on non-GNSS signals to determine the location of the Application/User Node.

Figure 5:
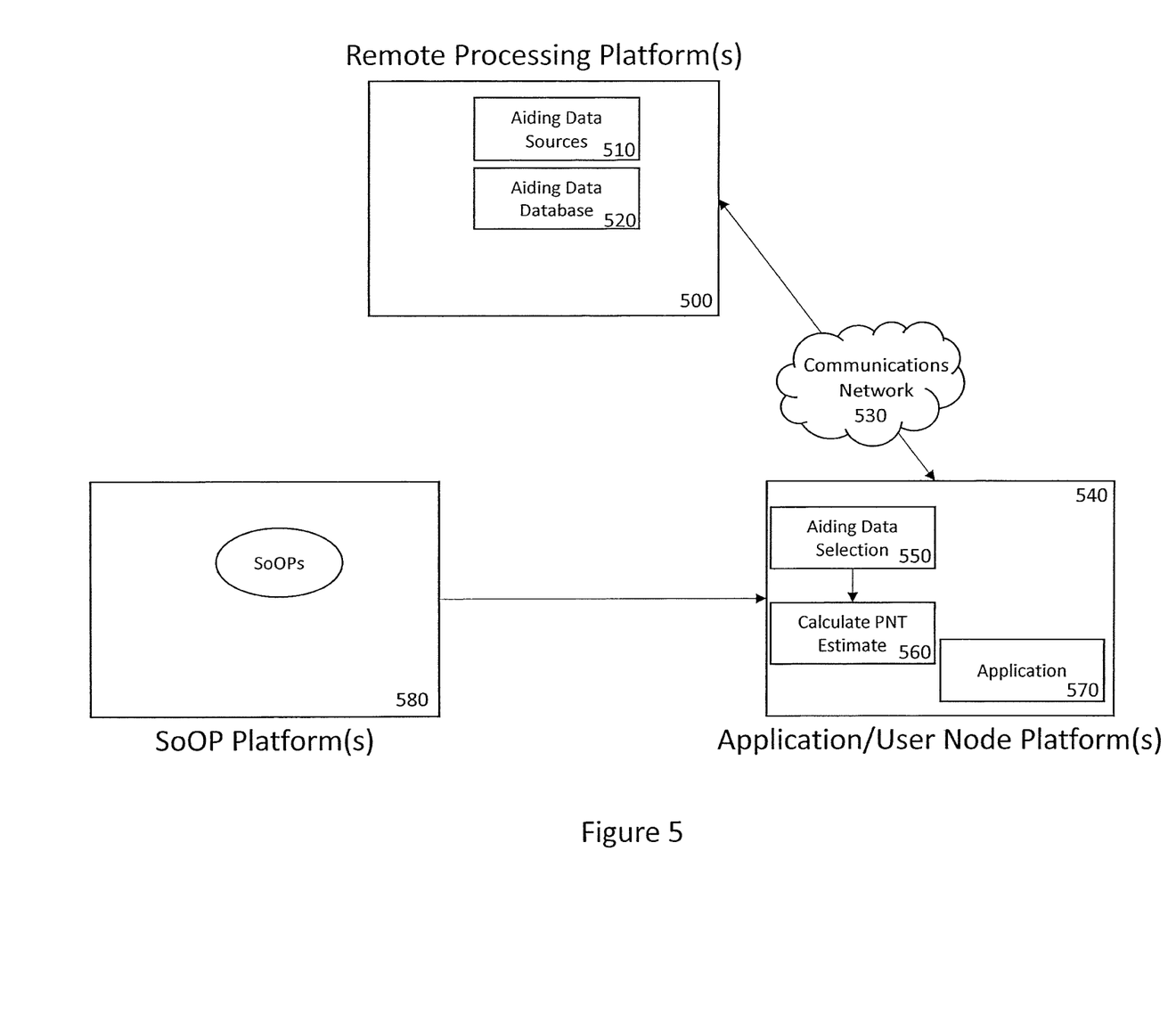
FIG. 5 shows one embodiment for implementation of aiding data processing.

FIG. 5 shows an embodiment where the aiding data selection 550 and the PNT estimation 560 are performed in the user node platform 540. The remote processing platform 500 includes the available aiding data sources 510 that are provided to an aiding data database 520. The remote processing platform 500, user node platform 570 and SoOP platform 580 are in communication with each other via network 530. The communications interfaces between these platforms can be of many types including wired, wireless, software interfaces, and multi-hop networks. While the aiding data may be heterogeneous, the aiding data database 520 can include aggregated aiding sources and can be used to identify available aiding data. The aiding data selection module 550 can select the appropriate aiding data from the remote processing platform 500. For example, aiding data database 520 can include broadcast TV transmitter location. The SoOP source selection module can select the signals transmitted by the TV transmitter and PNT estimate calculation 560 can be performed at the application/user node platform 540 using the measurements of the TV signals and the location of the TV transmitter. In this embodiment, the SoOP platforms 580 are providing only RF signals.

The remote processing platform 500 is in communication with the application platform 540. The selected aiding data can be used in conjunction with the SoOP signals received from the SoOP platform 580 to calculate a PNT estimate associated with the application platform 540. In one embodiment, the aiding data selection module 550 can include an algorithm that selects aiding data as a function of the required characteristics of the PNT estimate for the particular application 570 (referred to as User Equipment function in GPS architecture). Examples of application/user node 570 various characteristics requirements could be highest short-term location accuracy (for example estimating the location of an autonomous vehicle), highest long-term time accuracy (for example deriving precision time for a server doing stock transactions), bounded navigation error over a long time (for example a hiker moving through a forested area to a specific destination). Aiding data processing algorithms can be framed as optimization problem where many classes of optimization algorithms can be applied. Specific methods can be selected based on PNT requirements (accuracy, certainty, time to solution, persistence of solution, etc.), aiding data availability and characteristics, and local spectrum conditions.

Figure 6:
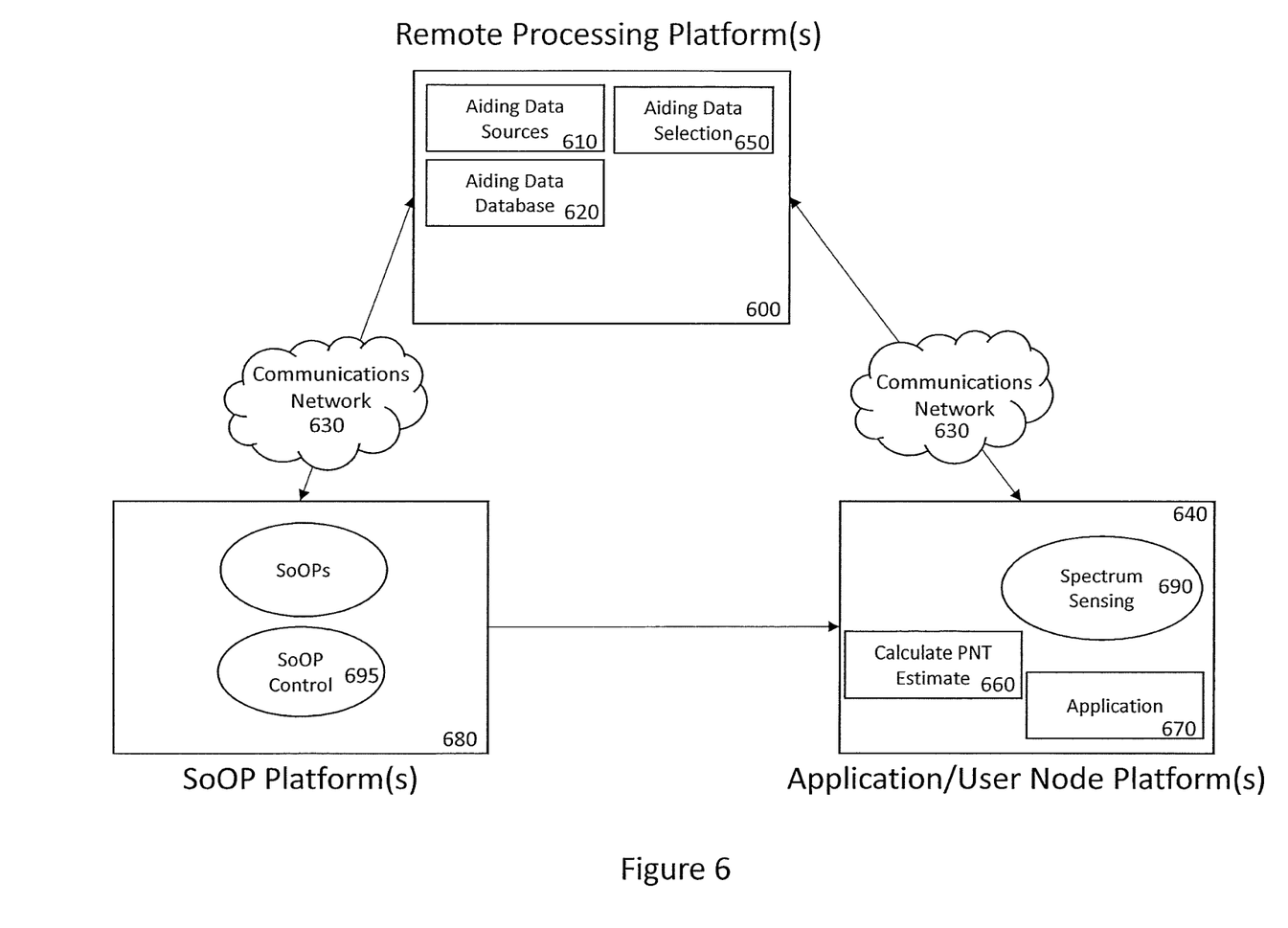
FIG. 6 shows a second embodiment for implementation of aiding data processing.

FIG. 6 shows another embodiment for providing and processing aiding data. In this embodiment, the aiding data selection 650 is performed at the remote platform 600. The user node platform includes the ability to sense the RF spectrum 690 and is particularly useful when controllable SoOPs are available. Aiding data in the form of spectrum sensing 690 can be provided to the remote processing platform 600 from the user platform 640 regard the RF spectrum being used in the environment of the use node platform. The aiding data selection 650 can be made at the remote processing platform 600 taking into account the RF spectrum sensing data 690, and can provide control signals to control the SoOP sources 695. An example of this would be where the RF spectrum sensing data 690 is used to control the frequency on which the SoOP transmits 695, such as a ground radar system.

In addition, a feedback loop can provide the PNT requirements of the application node 640 to the aiding data selection module 650 to assist in the selection of the appropriate aiding data as a function of the PNT characteristics. In addition, The PNT characteristic requirements can be communicated to the SoOP control module 690 to change the characteristics of the SoOP based on the PNT requirements.

The aiding data section module 650 can also select the appropriate aiding data from the database 620 as a function of the characteristics of the aiding data sources 610. The aiding data section module 650 can also select the appropriate aiding data from the database 620 as a function of the characteristics of the local spectrum environment 690 of the application platform 640. The application node can perform spectrum characterization through spectrum sensing module 690, or it can be provided remotely from another source.

Figure 7:
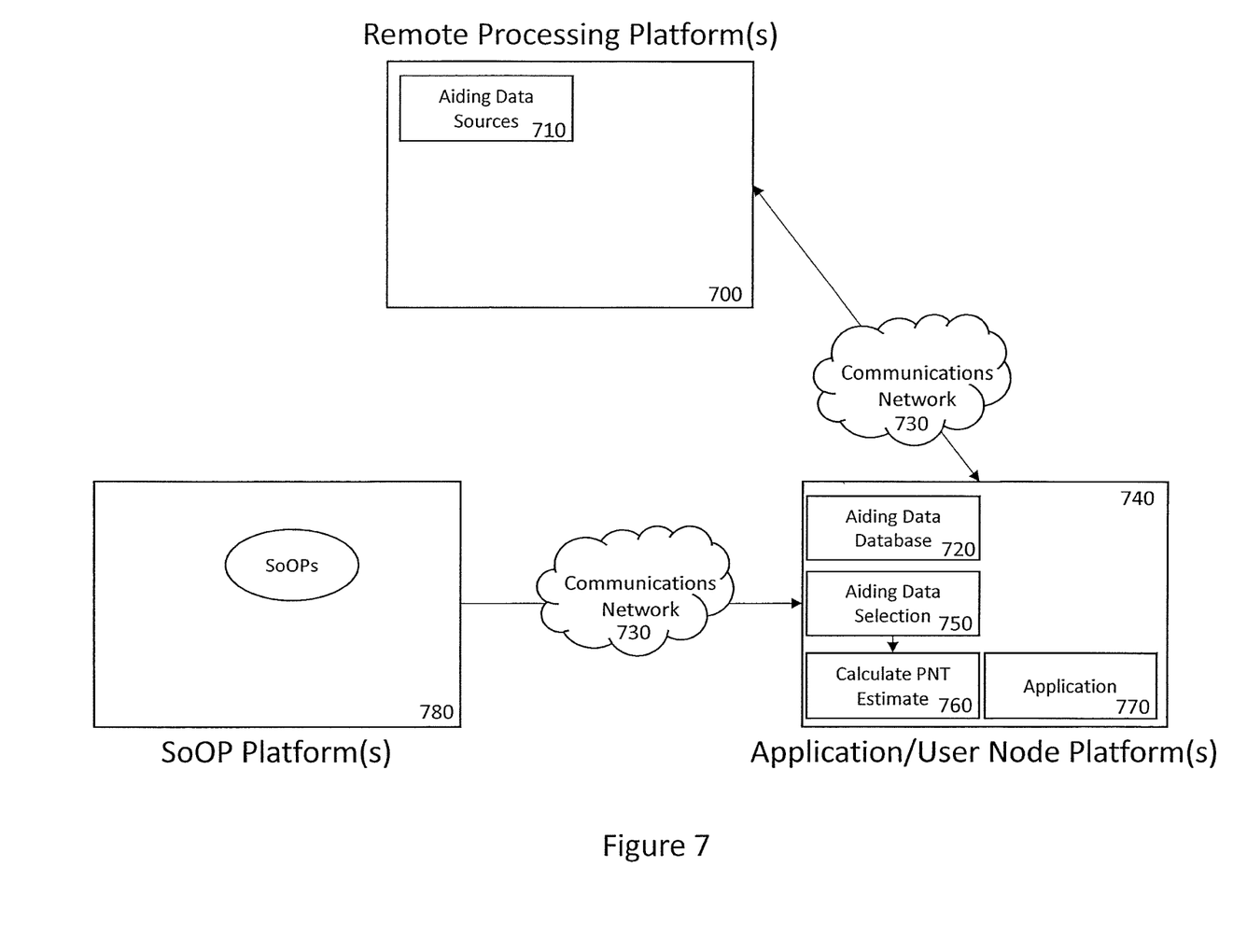
FIG. 7 shows a third embodiment for implementation of aiding data processing.

FIG. 7 shows another embodiment for providing and processing aiding data where the aiding database 720 and the aiding data selection 750 is hosted at the user node platform 740. In this embodiment, the aiding data sources 710 can be provided by the remote platform 700, and can be stored in the aiding data database 720 at the user node. 740. Aiding data selection 750 and processing and PNT calculation 760 is performed at the user node 740.

Many additional embodiments are possible where the defined functions are hosted and distributed in the 3 different defined platforms.

Figure 8:
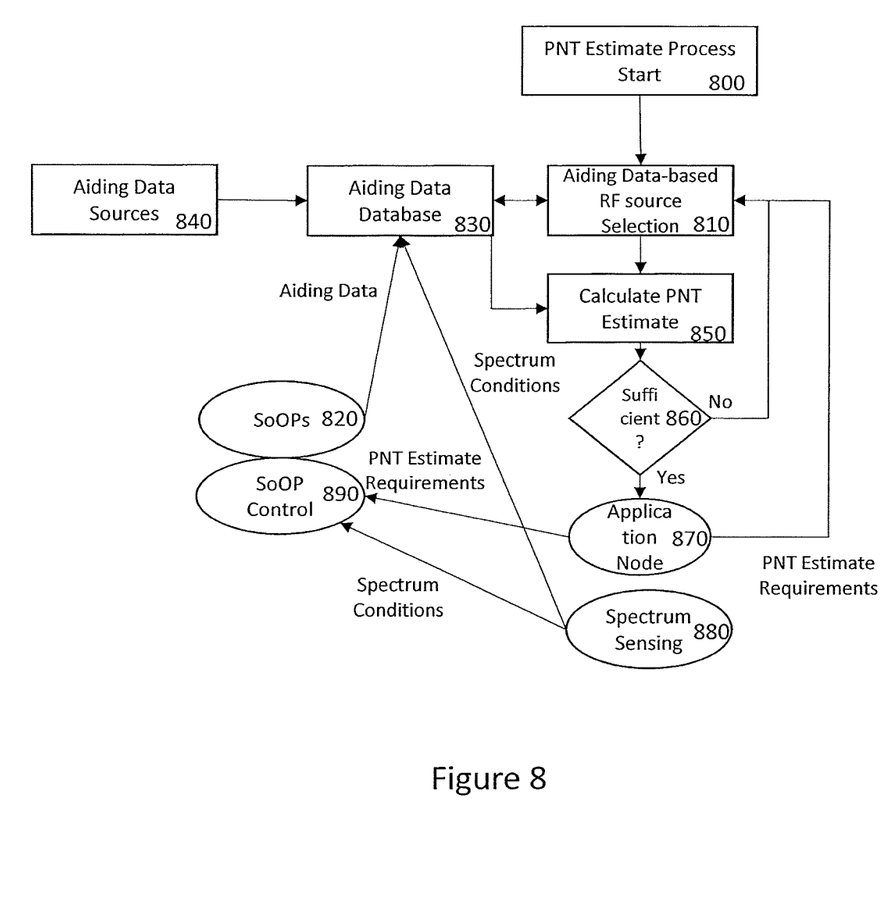
FIG. 8 shows a high-level flow diagram of one embodiment for SoOP and aiding data selection and PNT estimation.

FIG. 8 shows a simplified flow diagram of an embodiment the selection and processing of SoOPs to determine the PNT location for a user node. An application on a user platform may be tasked with determining PNT information 800 for the platform. Aiding data processing algorithms 810 may be used as long as one of the RF sources is a SoOP 820. In one embodiment, the PNT module selects SoOPs based on two factors: 1) received signal strength (either signal to noise of signal to interference), and 2) contribution to dilution of precision (DOP). Signal strength in the case of RF sources that can be in various frequency bands can also be thought of as choosing RF signal sources in "white space" (spectrum that is not occupied by other spectrum users).

In other embodiments, additional metrics can be considered in the selection process. The metrics could be associated with the characteristics of the candidate RF signal sources. For example, a signal with higher occupied bandwidth will produce a higher quality time or arrival estimate than lower occupied bandwidth signals, all other things being equal. Thus, occupied bandwidth can be a selection criterion. In another embodiment, the criterion can include the certainty to which the source RF transmitter location is known. The more uncertainty in the location of the transmitter, the higher the potential error associated with using the source. Another criterion can be the trust associated with the source signal. If there is a possibility that some aspect of the RF source can spoofed, then that can be taken into account in the selection process. Other possibilities could include the consistency of a signal measurement with others (is it an outlier as a contributing measurement of consistent with the majority of the other measurements), or detected multipath (are there multiple peaks in the matched filter response).

In another embodiment, the selection of SoOPs can be based on the desired level of performance. For example, high precision PNT needs may require a completely different set of SoOP signals than those for lower precision. This becomes useful when there are many competing PNT needs and limited sources. The availability of other measurement sources available at the receiver may also influence what PNT sources are needed. For example, if the receiver has an altimeter, or an IMU, or a speed sensor from a vehicle, then these all must be factored into the technique for how PNT sources are selected. In addition, these sources each have some level of quality that also weights their contribution. The requirement for 2D vs. 3D PNT requirements must also factor into the decision. Some applications may only need precision timing, and have less of a requirement for position, and vice versa.

Once the SoOPs are selected, the aiding database 830 can be accessed for aiding data associated with the selected SoOPs. In one embodiment, aiding data sources 840 can be accessed for updated aiding data that may not yet be populated in the database or if real-time data is required for dynamic sources.

The PNT module uses the SoOPs and associated selected aiding data, and measurement from other sources, if available, to determine PNT information 850. The PNT calculation module can use a number of different well-known mathematical algorithms in the selection/weighting of SoOPs process. Examples are maximum likelihood and least squares, or the use of algorithms that estimate "trust", or machine learning algorithms.

In one embodiment, a model-based selection approach can be used, where actual positions and uncertainties are calculated using RF source combinations, and minimum CEP would be the criteria for selecting RF sources. If the number of possible RF source signals is very large then a genetic algorithm may be a good choice vs. a brute force-all combination calculation.

Once the PNT is estimated, the results are checked to ensure they are sufficient for the application 860. If the PNT results are sufficient, they are provided to the user platform 870. If the results are not sufficient, the selection of the appropriate RF source and appropriate aiding data can be refined to address any deficiency in the sufficient of the PNT results. The use node may also provide feedback that may be useful in the particular SoOPs and aiding data selected for the PNT estimation. For example, the aiding data can be updated or adjusted based on the quality of the location measurements.

In some embodiments, the local spectrum conditions 880 can be communicated to the SoOP control 890, and the sources 820 can vary their characteristics based on the local environment. Likewise, the user module may provide PNT estimate requirements to SoOP control 890 to vary the characteristics based on the PNT requirements. For example, the local spectrum can be subject to scanning, and upon detection of a change in spectrum conditions, the RF source and the user equipment can be directed to change their respective operating characteristics. RF source frequency and waveform are just two of such operating characteristics, which would then require re-tuning of the user equipment as a function of the changed characteristics of the source.

The present disclosure is particular applicable in the event that traditional PNT signals are not available. For example, in GPS denied environments, or in response to spoofing attacks, an accurate PNT solution may be unavailable from PNT sources alone, but is possible when SoOPs sources are added. In addition, the availability of SoOPs and associated aiding data is increasing as advancements in technology have led to the creating of new SoOPs, particularly for communication purposes, which have resulted in creating new aiding data sources. For example, low earth orbiting (LEO) satellites have been identified as particular useful for increasing broadband communication coverage. LEOs may be a particular useful SoOP due to their planned deployment density, as well as the high Doppler shift associated with their transmitted signals. The differential Doppler shift from LEO satellite signals is particular useful for PNT estimation.

Additional sources of aiding data to use with the PNT estimation include sensor data that can help refine the selection of available SoOPs, and can also be used in the PNT estimation solution. For example, imaging technology can be used to select appropriate SoOPs by aiding in the location determination of a SoOP transmitter, and can also be used in the PNT estimation by bounding the location of the user platform. Likewise, barometric sensors and magnetic sensors can provide measurements that assist in the selection of the SoOPs and can be used in the PNT estimation.

Thus, as described above, the present disclosure describes how filtering the sources of SoOPs as a function of a PNT estimation advances the field on PNT estimation. This is particularly useful when the SoOPs are controllable because it allows the selection of aiding data to provide more accurate PNT estimations.

The present disclosure can be implemented by a general-purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Those skilled in the art will appreciate that the present invention can be practiced by other than the described embodiments, which are presented for the purposes of illustration and not of limitation, and the present invention is limited only by the claims which follow.

What is claimed:

1. A method of using aiding data for determining the location of a user, comprising:
   a. surveying an RF environment by monitoring a range of RF frequencies or sources;
   b. receiving a plurality of non-GNSS RF signals at a user from a plurality of first sources, wherein the first source is not a Global Positioning System or Global Navigation Satellite System;
   c. receiving aiding data associated with at least one of received non-GNSS RF signals, sent from a second source which is different than the first source, wherein the aiding data provides information about a received non-GNSS RF signal or a source of the received non-GNSS RF signal;
   d. in a processor, accessing the received aiding data associated with the plurality of received non-GNSS RF signals;
   e. in the processor, selecting aiding data as a function of a characteristic of the accessed aiding data source;
   f. in the processor, selecting at least one of the plurality of non-GNSS signals as a function of the selected aiding data;
   g. performing RF related measurements on the selected received non-GNSS signals; and
   h. in the processor, determining a location of the user as a function of the performed RF related measurements and the selected aiding data.

2. The method of claim 1 comprising the further steps of using the determined location of the user to select additional aiding data to further refine the location of the user.

3. The method of claim 1 comprising the further steps of (i) weighing each selected non-GNSS RF signal as a function of the aiding data and (ii) determining location of the user as a function of the selected weighted non-GNSS RF signals.

4. The method of claim 1 wherein at least one of the received non-GNSS RF signals is a signal of opportunity (SoOP).

5. The method of claim 1 wherein the aiding data is from an RF source.

6. The method of claim 5 wherein the aiding data includes a time tag.

7. The method of claim 1 wherein the aiding data includes RF spectrum sensing data which indicates what RF frequencies may be received without interference at the user.

8. The method of claim 1 wherein the step of selecting the non-GNSS RF signals includes a measurement of a non-GNSS RF signal and determining an associated quality metric.

9. The method of claim 8 comprising the further steps of (i) weighing each selected non-GNSS RF signal as a function of the associated quality metric and (ii) determining location of the user as a function of the selected weighted non-GNSS RF signal.

10. The method of claim 1 wherein the step of selecting the aiding data further comprises selecting the aiding data as a function of the characteristics of the local spectrum environment at the user platform.

11. The method of claim 1 wherein the step of selecting a non-GNSS RF signals includes selecting a non-GNSS RF signal as a function of a) received signal strength and b) contribution to dilution of precision (DOP).

12. The method of claim 1 wherein the step of selecting the non-GNSS RF signals includes selecting a non-GNSS RF signal as a function of a desired level of performance.

13. The method of claim 1 wherein the step of selecting the non-GNSS RF signals includes selecting the non-GNSS RF signal as a function of a characteristic of an RF signal source that transmitted the non-GNSS RF signal.

14. The method of claim 1 further comprising the steps of (i) receiving a GNSS signal at the user, (ii) performing RF measurements on the selected received non-GNSS signals and the received GNSS signal, and (iii) determining a location of the user as a function of the performed measurements and the selected aiding data.

15. The method of claim 1 wherein the plurality of non-GNSS signals includes a signal from a communications satellite, and the aiding data includes ephemeris data for the communications satellite.

16. The method of claim 1 further comprising the steps of (i) performing ranging measurements using the non-GNSS signal RF related measurements, and (iii) determining a location of the user as a function of the performed ranging measurements and the selected aiding data.

17. The method of claim 1 wherein the user is a pedestrian, a vehicle, an aircraft or a ship.

18. The method of claim 1 comprising the further steps of:
h. sensing the RF environment at the user;
i. changing an operating characteristic of an RF source that transmitted the non-GNSS RF signal as a function of the sensed RF environment;
and j. retuning a receiver at the user as a function of the changed operating characteristics.

19. The method of claim 18 wherein the operating characteristic characteristics include one of frequency and waveform.

20. The method of claim 1 wherein the non-GNSS signal is transmitted from a low earth orbiting satellite and the RF related measurement includes relative Doppler shift.

21. The method of claim 1 wherein at least one of the plurality of non-GNSS signals is transmitted from a first transmitter of a prior unknown location and further comprising the step of determining a location of the first transmitter as a function of the selected accessed aiding data.

22. The method of claim 1 wherein the step of performing RF related ranging measurements includes determining a time difference of arrival of at least two signals.

23. The method of claim 1 wherein the at least one of a plurality of non-GNSS signal includes a communication signal.

24. The method of claim 23 wherein the communication signal includes at least one of a WIFI signal, a WIMAX signal, radar, a cellular signal, a digital television signal, or a signal from an orbiting satellite.

25. The method of claim 1 wherein the step of performing RF related measurements includes ranging measurements.

26. A method of using aiding data for determining the location of a user, comprising:
a. surveying an RF environment by monitoring a range of RF frequencies or sources;
b. receiving a plurality of signals of opportunity (SoOPs) at a user from a plurality of first sources, wherein the first source is an RF source not mainly intended for positional, navigational and timing purposes;
c. receiving aiding data associated with at least one of the received SoOPs sent from a second source which is different than the first source, wherein the aiding data provides information about a received SoOP or the source of the SoOP;
d. in a processor, accessing aiding data associated with the plurality of received SoOPs;
e. in the processor, selecting aiding data as a function of a characteristic of the accessed aiding data source;
f. in the processor, selecting at least one of the plurality of SoOPs as a function of the selected aiding data;
g. performing RF related measurements on the selected received SoOPs;
and h. in the processor, determining a location of the user as a function of the performed RF related measurements and the selected aiding data.

27. A method of using aiding data for determining time at a user, comprising:
a. surveying an RF environment by monitoring a range of RF frequencies or sources;
b. receiving a plurality of non-GNSS RF signals at a user from a plurality of first sources, wherein the first source is not a Global Positioning System or Global Navigation Satellite System;
c. receiving aiding data associated with at least one of received non-GNSS RF signals, sent from a second source which is different than the first source wherein the aiding data provides information about a received non-GNSS RF signal or the source of the received non-GNSS RF signal;
d. in a processor, accessing the received aiding data associated with the plurality of received non-GNSS RF signals;
e. in the processor, selecting aiding data as a function of a characteristic of the accessed aiding data source;
f. in the processor, selecting at least one of the plurality of non-GNSS signals as a function of the selected aiding data;
g. performing RF measurements on the selected received non-GNSS signals;

and h. in the processor, determining a time at the user as a function of the performed RF measurements and the selected aiding data.

* * * * *